United States Patent [19]

Simionato

[11] Patent Number: 5,613,590
[45] Date of Patent: Mar. 25, 1997

[54] DEVICE FOR DISTRIBUTION OF MATERIAL WHICH IS LOOSE OR IN SINGLE PIECES

[75] Inventor: Paolo Simionato, Padova, Italy

[73] Assignee: Simionato S.P.A., Padova, Italy

[21] Appl. No.: 362,851

[22] Filed: Dec. 23, 1994

[51] Int. Cl.$^6$ .................................................. G01G 13/08
[52] U.S. Cl. .................. 198/358; 198/369.5; 198/572; 198/587; 198/601; 177/58; 177/DIG. 11
[58] Field of Search .................................... 198/358, 959, 198/524, 572, 587, 601, 369.5; 177/54, 58, 83–88, DIG. 11

[56] References Cited

U.S. PATENT DOCUMENTS

| | | | |
|---|---|---|---|
| 2,966,253 | 12/1960 | Gerrans | 198/572 |
| 3,156,311 | 11/1964 | Olofsson et al. | 198/959 X |
| 3,308,972 | 3/1967 | Jensen | 198/587 X |
| 3,339,651 | 9/1967 | Garnett | 177/58 X |
| 3,365,083 | 1/1968 | Baumann et al. | 198/369.5 X |
| 4,131,192 | 12/1978 | Cipolla | 198/524 X |
| 4,561,510 | 12/1985 | Sugioka et al. | 198/959 X |
| 4,569,405 | 2/1986 | Oshima | 198/959 X |
| 4,600,096 | 7/1986 | Yamano et al. | 198/601 X |
| 4,683,966 | 8/1987 | Nakagaw et al. | 177/DIG. 11 X |

FOREIGN PATENT DOCUMENTS 4240094  6/1994  Germany ................................ 198/572

*Primary Examiner*—David A. Bucci
*Attorney, Agent, or Firm*—Young & Thompson

[57] ABSTRACT

A device for feeding and distributing material which is loose or in single pieces to a plurality of collection points peripheral to the device itself comprising a main fixed support framework, a plurality of radial channels for transporting the material to the collection points supported by the framework, and a part for distributing the material to the transport channels, supported rotatably above the channels, whereto the material is fed and transferred by the latter through falling and distributed by rotation to the radial transport channels.

14 Claims, 2 Drawing Sheets

DEVICE FOR DISTRIBUTION OF MATERIAL WHICH IS LOOSE OR IN SINGLE PIECES

BACKGROUND OF THE INVENTION

The present invention relates to a device for feeding and distributing material which is loose or in single pieces to a plurality of collection parts.

More particularly it sets out to distribute to collection parts arranged peripherally to the device predetermined and controlled quantities of a material which is fed loose in a central point of the device itself.

The present device also aims at solving the problem of distribution of sticky material, such as for example fruit and vegetable products, which, by adhering to the surface of known distribution apparatus, have a suction effect on the walls, slowing down or blocking the flow of the product and jeopardising the correct operation of the apparatus.

The object of the present invention is that of providing a device for the distribution to a plurality of peripheral collection parts of predetermined and controlled quantities of a material, fed at random in a predetermined point of the device itself, and wherein the product is transferred to said peripheral collection points by means of corresponding radial transfer channels.

Another object of the present invention is that of providing a device which avoids the disadvantageous clogging of the routes of the product which occur in distributors known hitherto when the latter deal with sticky material.

A further object is that of providing a distributor device which has a simple construction with easy preparation and maintenance.

SUMMARY OF THE INVENTION

The above object are achieved with a device for the distribution of material which is loose or in single pieces, comprising a main support framework around which are arranged a plurality of parts for collecting the material, an element for transferring predetermined quantities of material to said peripheral collection parts comprising a plurality of radial channels for transferring a predetermined quantity of material to a respective collection part, each of said transfer channels being attached to said main framework and having an external end edge arranged at the respective collection part and provided with an opening for the transfer of material to the collection part, a part for the distribution of said predetermined quantities of material to each of said transfer channels attached to said framework so as to be free to rotate around a vertical axis and arranged in a position above said transfer element; said distribution element is fed with said material and has at least one end for transfer by falling of said material to said transfer element and also being driven to rotate to distribute the respective said predetermined quantities of material to each of said transfer channels; said device also comprises means for driving rotation of said rotating distribution part, means for driving transfer of the material along said radial transfer channels and means for driving movement of the material in said rotating distribution part.

With the distributor device of the present invention, it is therefore possible, thanks to use of a rotating distributor element to convey and distribute at an high speed and with an high efficiency a considerable quantity of products to be packaged in a plurality of periferally placed collection members.

BRIEF DESCRIPTION OF THE DRAWINGS

The present invention will be made clearer on reading the following description relating to a preferred embodiment of the invention to be read with reference to the accompanying drawings, in which.

DESCRIPTION OF THE PREFERRED EMBODIMENT OF THE INVENTION

Figure 1:
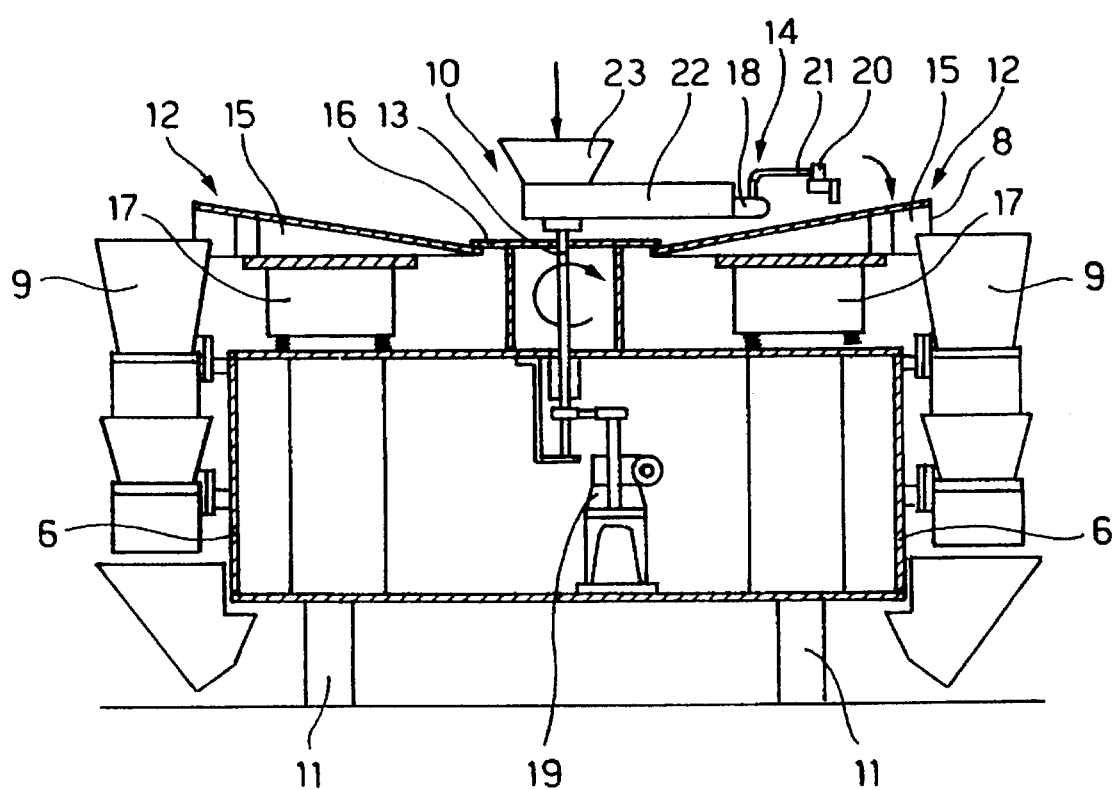
FIG. 1 is a section view of the distributor device of the preferred embodiment of the invention.

As shown in FIG. 1, the device 10 for feeding and distributing material, be it loose or in single pieces, to parts 9 for collection of the material, represented here in the form of baskets, comprises a main fixed support framework 11, an element 12 for transferring material to peripheral collection points 9 supported by said main framework 11 and a part 14 for the distribution of predetermined quantities of material to said transport element 12 which is supported by a vertical shaft 13 which extends above said framework 11.

Figure 2:
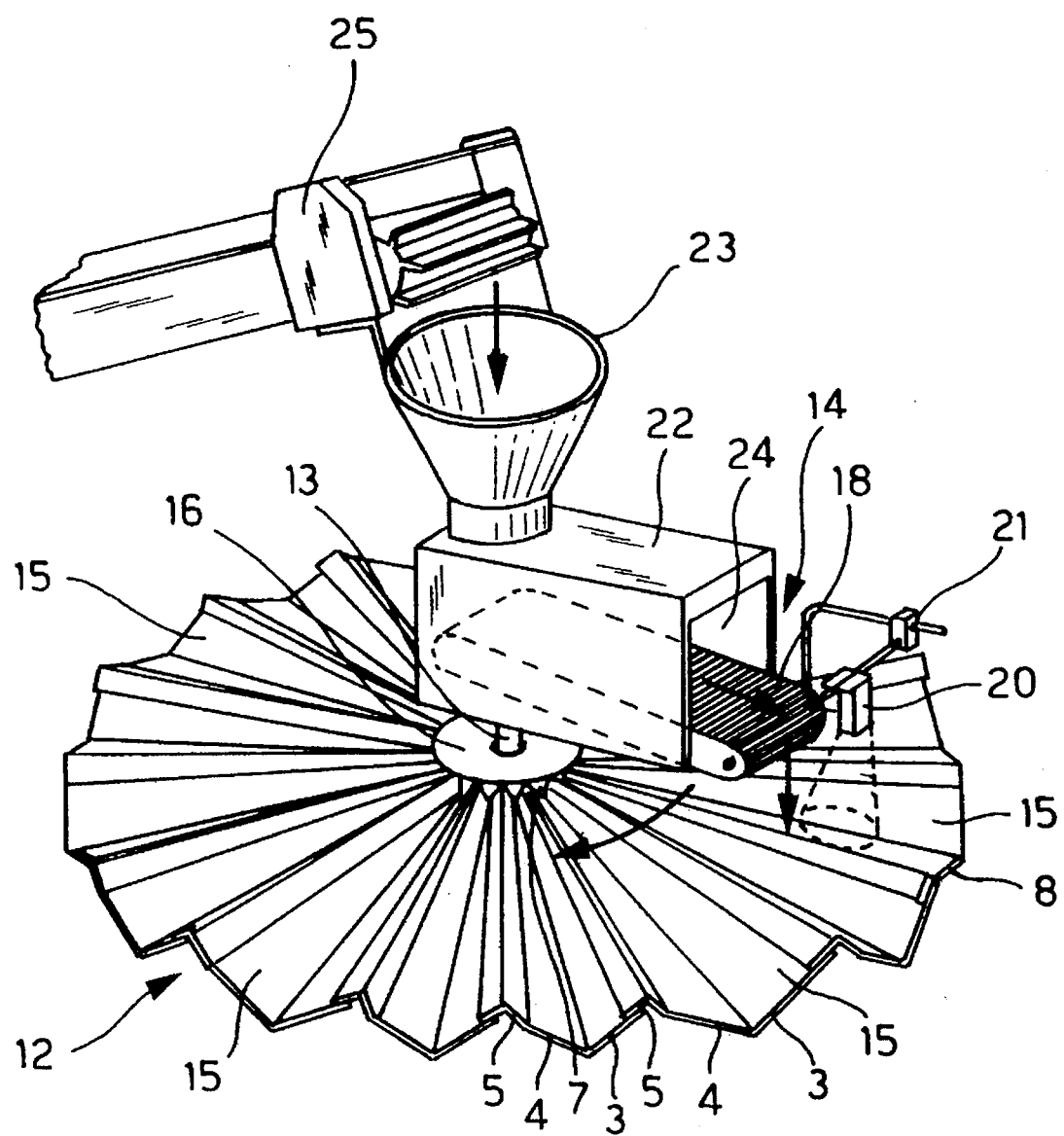
FIG. 2 is a perspective view of the upper part of the same distributor device.

The element 12 comprises, as is shown more clearly in FIG. 2, a plurality of channels 15, which are attached at one of their end edges 7 to a central crown 16 integral with the main framework 11. The channels 15 extend cantilevered in a radial direction beyond the peripheral edge 6 of the main framework 11, arranging their other end edge 8, which is open, at the parts 9 for collecting the material.

Each of said channels 16 is driven to vibrate by means of rectilinear vibrators 17 arranged below each channel and between said fixed framework and the channel transport element and acting to vibrate the respective channel in order to confer to the loose material inertial impulses for forward movement to the collection points.

Each of said transfer channels is in the form of a section bar with a generally "V"-shaped section whose geometrical dimensions increase gradually starting from the end edge for attachment to said main framework.

In order to confer structural continuity to the channel element such as to prevent the material falling and at the same time maintain the vibrations of the single channels 16 independent, the latter are arranged coplanar and adjacent and moreover the lateral edges of the adjacent channels are placed, for a certain length, one on top of the other. The above is obtained according to the invention by bending an end longitudinal portion 5 of one of the two wings 3 and 4 of the "V" section bar downwards in order to be arranged parallel and touching the opposite wing 3 of the adjacent channel.

The part 14 for distributing loose material comprises a belt conveyor 18 which is attached in whatsoever suitable way above said central shaft 13 and extends radially, parallel to and above said channels 15.

The distribution part 14 is made to rotate in a plane parallel to the channels 15, as shown by the arrows in the figures, so as to distribute on them predetermined and controlled quantities of material. For this purpose a motor 19 is provided, housed inside said framework 11, which drives rotation of the axle 13 for supporting the distribution part.

The belt of the belt conveyor 18, on whose surface the material to be distributed is placed, is driven to move forwards towards one return end of the belt, wherein said material is made to fall onto the channel 15 below, by means of a suitable drive motor (not shown). Said motor for driving the belt forwards is controlled by means of an optical device 20 which detects the presence of material on the channel below at the end for transfer or release of material of the distribution part.

Said optical device is attached to the distributor part by means of an adjustable arm 21 projecting in front of the latter to allow the optical device to "see" the channel below in the best possible way.

The present invention also provides a box-shaped element 22, surrounding part of the conveyor belt at the end of the belt attached to said support axle 13, which is used to contain and guide the material transported by the belt 18 along at least one portion of the belt 18.

The box-shaped body 22, which is integral with said vertical shaft 13, has in its upper wall an opening which faces the opening of a conical hopper 23 for loading the material, the hopper being integral with said box-shaped body 22 and coaxial to said vertical shaft 13.

The box-shaped body 22 also has a front opening 24 wherefrom the belt conveyor 18 exits and whose amplitude is such as to allow the exit onto the belt 18 of required quantities of product.

Briefly the functioning of the distributor device of the invention is as follows: the material is fed into the distributor device, pouring it from above, for example by means of a loading device 25, into the hopper 23. When the optical detector 21 indicates a lack of material to the underlying channel 15, the conveyor belt 18 transports the material along the path indicated by the arrows towards the release end where it allows the material to fall in a suitable point of the transfer channel 15. The photoelectric cell 20, simultaneously with actuation of the motor for driving the belt 18 forwards, actuates the motor 19 for driving rotation of the support shaft 13 so that the latter, by causing the belt to rotate horizontally, allows material to fall in succession on all or part of the channels 15.

Having reached the channel the material is conveyed by vibrations to the corresponding peripheral collection part 9.

The rotation speeds of the shaft 13 and those of the forward movement of the conveyor belt 18 are synchronised in order to confer the collection points with predetermined and required quantities of material.

With the distributor device of the invention, it is therefore possible, thanks to the use of a rotating distributor element such as the belt conveyor 18 which carries and allows the material deposited thereon to fall and of transport channels 15 driven to vibrate, to convey and distribute peripherally also those products which have adherence properties, such as fruit and vegetable products, or of a shape such as to obstruct the paths of the material in traditional devices.

It is understood that what has been said and shown with reference to the accompanying drawings has been given purely by way of an illustration of the present invention.

What is claimed is:

1. A device for the distribution of material to a plurality of parts for collecting the material arranged circumferentially of the device, comprising a plurality of radial channels each for transferring material to a respective collecting part, a part for the distribution of said material to said radial transfer channels which is fed with said material and is driven to rotate around a vertical axis for distributing material to each of said radial transfer channels; means for driving transfer of the material along each of said radial transfer channels, means for driving movement of the material in said rotating distribution part, means for driving rotation of said rotating distribution part, and an individual means for sensing the presence of material on each of said channels, said sensing means being mounted on said distribution part for rotation therewith.

2. A device according to claim 1, in which said distribution part is arranged in a position above said transfer channels.

3. A device according to claim 1, comprising a main support framework, each of said transfer channels being attached to said main support framework at a respective central end and extending horizontally toward the respective collecting part.

4. A device according to claim 1, in which said transfer channels are coplanar and adjacent each other.

5. A device according to claim 1, in which said transfer channels extend radially outwardly beyond a peripheral edge of said main framework.

6. A device according to claim 1, in which each of said transfer channels is in the form of a section bar with a "V"-shaped section, whose geometrical dimensions increase progressively starting from a radially inner end attached to said main framework and in which each of said "V" section bars has a wing with a longitudinal portion bent towards and against the opposite wing of the adjacent channel.

7. A device according to claim 1, in which said means for driving transport of the material along said channels comprise vibrators arranged below said channels to drive the vibration of said channels and confer inertial impulses of forward movement to said loose material.

8. A device according to claim 1, in which said rotating distribution part comprises an endless belt conveyor supported by a vertical shaft attached to said main framework, said vertical shaft being arranged in a central position of the main framework and extending upwards beyond said channel elements; said belt conveyor having a surface of the belt whereon the material is deposited and which extends from said support shaft radially outwardly and ends with a return end of the belt which defines an end of transfer of the material to the channel below, said belt conveyor being made to rotate about said vertical axis to distribute predetermined quantities of material to each of said channels.

9. A device according to claim 8, in which said means for driving rotation of said rotating part for distribution of the material comprise a motor for driving rotation of said shaft.

10. A device according to claim 8, in which a hopper is provided for loading material connected to said vertical shaft and arranged above said distribution part and which feeds the material towards the distribution part.

11. A device according to claim 8, in which at least an end of said belt conveyor which is attached to said vertical shaft is housed inside a box-shaped body which contains and guides the material lengthwise of the belt conveyor.

12. A device according to claim 11, in which said box-shaped body has an upper opening for loading of the material onto said conveyor belt.

13. A device according to claim 2, in which said sensing means comprises an optical device which detects the presence of material on the channel below at an end of said distribution part.

14. A device according to claim 13, in which said optical device is attached to the distribution part by means of an adjustable arm projecting in front of the distribution part.

* * * * *